June 1, 1937.　　　R. L. SESSIONS　　　2,082,032
WHITE LEAD PIGMENT AND METHOD OF MAKING THE SAME
Filed July 12, 1934
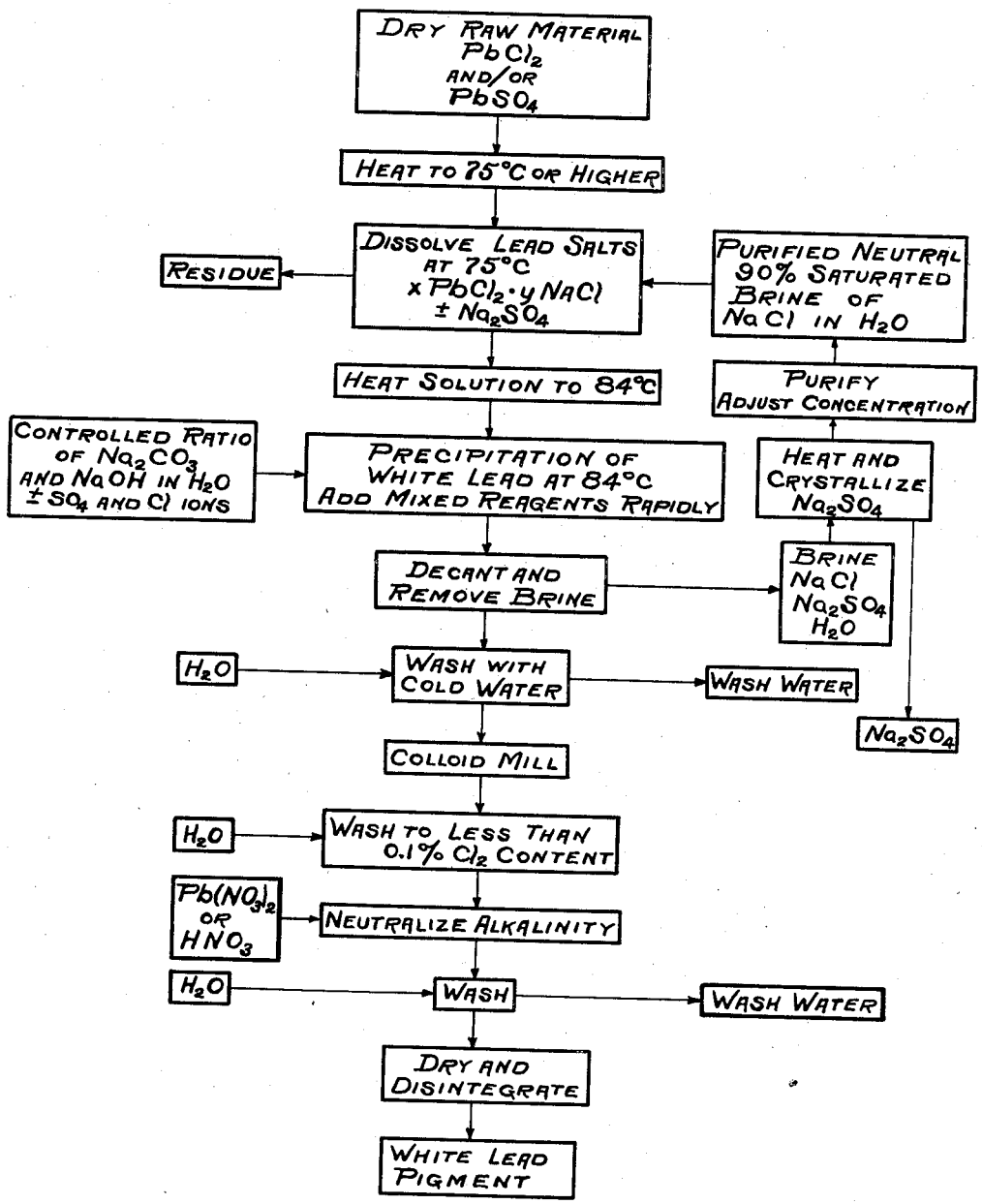
Inventor
ROYAL L. SESSIONS
By Clayton L. Jenks
Attorney Patented June 1, 1937

2,082,032

UNITED STATES PATENT OFFICE 2,082,032

WHITE LEAD PIGMENT AND METHOD OF MAKING THE SAME

Royal L. Sessions, Denver, Colo., assignor to Hughes-Mitchell Processes, Incorporated, Denver, Colo., a corporation of Wyoming Application July 12, 1934, Serial No. 734,864

15 Claims. (Cl. 23—71)

This invention relates to the manufacture of white lead for use as a pigment.

The primary object of this invention is to provide a white lead pigment which is of high quality as regards its resistance to weather, covering power, tinting strength, whiteness of color, dispersion in oil, and the size and texture of the particles of the pigment, as well as to provide an economical and efficient process for manufacturing the same.

White lead is considered to be a complex molecular compound of the formula $2PbCO_3.Pb(OH)_2$. Some of the commercial products commonly used as pigments depart, however, from this formula to a large extent, in not having the correct ratio of the lead carbonate and lead hydrate contents and because of the presence of impurities therein. It is desirable that the product approach closely in its analysis this molecular composition, although beneficial properties may be imparted thereto by having a slight but controlled excess of either the carbonate or the hydrate portion of the composition. The pigmentive properties are, therefore, determined in part by the composition of the white lead; but they are also particularly dependent upon the method by which the material has been made. For example, the procedure employed may result in an excess of either the carbonate or the hydrate portion of the molecule over that required by the formula, or it may leave intermixed therewith various unconverted compounds remaining from previous stages in the process. Moreover, and of primary importance, the texture and the size and structure of the pigment particles is very largely determined by the process employed.

It has been proposed heretofore, in accordance with what is known as the Milner process, to produce white lead by first converting metallic lead to lead oxide and then treating the latter with sodium chloride in solution to form a precipitate, which is thereafter gradually converted to white lead by treating it with carbon dioxide gas while suspended in water until the chlorine of the molecule has been replaced by the carbonate radical and the proper degree of carbonating has been effected. It has also been proposed to dissolve lead chloride in a brine of sodium chloride and then treat it first with a solution of sodium hydroxide to form an insoluble precipitate and then with carbon dioxide gas to convert that precipitate to the desired white lead.

In the course of my experimentation, I have discovered certain fundamental principles which should be observed in the manufacture of white lead. Lead chloride or lead sulfate goes into solution in a hot brine of sodium chloride with the formation of a complex salt having the formula $xPbCl_2.yNaCl$ which is soluble in the brine while maintained at a temperature above a critical point. Upon cooling the brine, this complex salt crystallizes out. If this hot lead bearing brine is treated with caustic soda, it is found that when about 25% or 30% of the soda has been added, all of the lead is precipitated. When more of the sodium hydrate is added, this precipitate is gradually converted to a compound containing a larger content of lead hydrate. This final precipitate, which is believed to be lead hydroxychloride and to have the formula $PbCl_2.3PbO.4H_2O$, remains as a solid substance during its treatment with carbon dioxide gas to form the lead hydroxycarbonate, or white lead. Similarly, in the Milner process, the lead oxide dissolved in sodium chloride forms the same intermediate lead hydroxychloride precipitate.

Each of these prior art processes requires that this solid material, lead hydroxychloride, be converted gradually to another solid material, the white lead, and that the analytical composition and the structure of each particle change continuously during the conversion of one solid substance to another. It is evident that such a procedure is very likely to leave unconverted lead chloride, lead hydroxychloride or lead hydroxide in the final product, because of the inability of the reagent solution or gas to reach and attack the inner portions of the particles or aggregates of molecules. Hence, the method of procedure necessarily affects the structure as well as the composition of the pigment particles and, therefore, their pigmentive properties. It is found that the inferior grades of white lead contain considerable amounts of unconverted compounds, and that these cause various undesired chemical reactions during use of the paint. For example, free lead hydroxide in the paint is easily attacked by destructive elements in the atmosphere, such as $CO_2$, salt spray, $H_2S$, etc., and the paint becomes checked and otherwise weathers badly. It is important to control the composition as well as the structure of the pigment particle.

White lead is believed to be a definite chemical compound which tends to assume a definite physical structure; hence, it should be so made, contrary to general practice, as to provide a controlled composition and to allow the material to freely assume its natural structure. A process which requires that a product be in a solid state, or in a dry condition, while it is being converted to its final chemical composition and structure, is fundamentally wrong in theory.

A further object of the invention is accordingly to provide a method of making white lead which will have a definite chemical composition and a desired physical structure, and which will be substantially free from impurities capable of detrimentally affecting its pigmentive properties, and thereby to produce a pigment of superior quality for use as a paint.

A further specific object is to provide a method of making white lead of a definite chemical composition from a solution of lead chloride in a sodium chloride brine and to avoid the presence of undesired impurities or residual unconverted compounds in the final product, and particularly to avoid problems inherent in the prior art processes which involved the gradual conversion of one chemical compound to another while in a solid state.

In accordance with this invention, I propose to produce white lead or basic carbonate of lead having a controlled ratio of $PbCO_3$ to $Pb(OH)_2$ which may conform with the formula $2PbCO_3.Pb(OH)_2$ or contain a slight excess of either $PbCO_3$ or $Pb(OH)_2$ over the molecular formula, as is determined by the pigmentive properties desired. To this end, I provide an alkali metal chloride brine solution of a lead salt, which may be either lead sulfate or chloride or other salt capable of dissolving in the brine and then convert the lead in solution directly to the desired white lead by a substantially instantaneous or rapid process which prevents or minimizes the formation of the intermediate lead hydroxychloride. This is preferably accomplished by treating a lead and sodium chloride solution directly with a predetermined amount of a mixture of two reagents, an alkali metal hydroxide and an alkali metal carbonate, or their equivalents, in a controlled ratio, as is required for making white lead. Sodium hydroxide and sodium carbonate are preferably used in the process, but similar compounds of other alkali metals, such as potassium, may be used. The desired composition of white lead will be obtained if the intermixture is carried on rapidly and under conditions whereby the pulp does not become alkaline until all of the precipitating reagents have been added.

One of the discoveries of this invention lies in the fact that the white lead may be precipitated directly from a complex solution bearing the chlorine and sulfate ions and by means of solutions containing the carbonate and hydroxyl ions which may also contain chlorine and sulfate ions. Hence, the lead solution may be initially derived by dissolving lead sulfate in sodium chloride at a temperature at which the complex lead and sodium chloride salt remains dissolved, and the treatment may be carried on without removing the sulfate radical from solution. This process also preferably contemplates the use of a complex solution of lead and sodium chlorides and not a direct solution of lead chloride in water.

As a further important feature of this process, it is proposed to dissolve the lead in a salt solution which is of high concentration but not saturated with NaCl, and to hold the brine temperature not higher than about 75° C. while dissolving the lead therein, so as to provide a strong solution of the lead salt which may be saturated at that temperature of 75° C. Thereafter, the temperature is raised to the vicinity of 84° C. so as to have the solution unsaturated with respect to both the lead and the sodium ions; and while in this unsaturated condition the solution is treated with the precipitating solution to cause the direct formation of white lead therefrom. Various other important features will be apparent in the following disclosure.

Referring to the drawing, I have there illustrated diagrammatically as a flow diagram the various steps employed in converting a material containing lead sulfate and lead chloride to white lead, but it is to be understood that either of these materials, or a mixture thereof, may be employed as the raw material for this process, and that the solution of lead and sodium chlorides may be derived from any other suitable source, such as a sulfated or chloridized lead bearing ore material or a natural lead sulfate, such as anglesite. A suitable ore material may be obtained by treating a complex lead and zinc sulfide ore according to the process described in the U. S. patent to Mitchell, No. 1,979,281 dated November 6, 1934. If lead oxide is present to some extent, it will be ultimately converted to white lead by the process. If the ore is complex in its composition, it is to be understood that it or the resultant solution will be so treated as to prevent the presence of undesired elements which would appear in the precipitated white lead, such as zinc chloride which would form the insoluble zinc carbonate.

There are various important conditions which should be satisfied if the process is to be carried on efficiently and uniformly. In the first place, it is to be noted that the solubility of the lead salts, lead sulfate and lead chloride, increases with the concentration of the sodium chloride solution as well as its temperature. It is, therefore, desirable to use as strong and as hot a solution of salt as is consistent with the other features of the process for dissolving the lead. The preferred concentration of sodium chloride solution is one which is about 90% saturated at room temperature. This unsaturated salt solution should have a temperature not higher than but preferably about 75° C. but, of course, high enough to hold a large amount of lead in solution. By observing these conditions, various problems are avoided. For instance, a concentrated salt brine is very difficult to filter because of the tendency for salt to crystallize out and clog the filter; whereas a 90% solution is not. By having the temperature not above 75° C. when the lead sulfate or chloride is dissolved in the brine, it is now possible to raise the temperature at a later time to 84° C., or thereabouts, at which a solution which was saturated with the lead salt when the ore material was leached may be unsaturated at the time of precipitating the white lead. Otherwise, lead chloride, which crystallizes out of a solution as it cools, would tend to precipitate to some extent during the formation of the white lead, and thus lead chloride would be entrapped in the pigment. The washing of this pigment by a cold water solution will not remove the entrapped lead chloride and this would, therefore, form a residual contamination of the final product.

In order to avoid complications in leaching a cold body of ore material with a hot salt brine, I prefer to dry the ore material containing the lead salt, if it has been previously wet, and to heat the same to a temperature above 75° C., at which the brine passed thereover will have a resultant temperature of approximately 75° C. when carrying the lead in solution. Of course, the temperatures of the solution and/or the ore material may each be suitably regulated to provide a concentrated or strong solution of lead in a salt brine.

As further conditions which aid in the production of a pigment of superior quality, it is desirable that the salt brine solvent for the lead be purified or free from all impurities which would be precipitated by a sodium carbonate solution. Otherwise, these impurities would be thrown down at the wrong time and in intermixture with the white lead. For that reason, the salt brine may contain or be initially treated with a slight amount of sodium carbonate, in which case the brine is filtered in order to carry off those impurities which are thrown down by the carbonate ions, but the excess of carbonate should be removed to prevent the formation of lead carbonate when leaching the ore material. This brine should, moreover, have a neutral reaction and not be either acid or alkaline. An acid reaction would permit the salt brine to dissolve iron and other elements, if present in the raw material from which the lead is derived, and thus carry contaminating impurities into the lead chloride solution. An alkaline reaction would leave an insoluble lead compound, such as lead carbonate, in the residue remaining after any filtering stage.

Since lead sulfate may be present in the ore material, and thus result in sulfate ions being present in the NaCl brine, it is also entirely feasible to employ a brine initially which contains this sulfate ion, provided it is not present in such a large amount as to interfere materially with the step of dissolving the lead. Since NaCl and $Na_2SO_4$ have a common ion, the solubility of the NaCl is decreased by increasing the amount of the other; and the solubility of the lead chloride is indirectly affected by lowering the concentration of the sodium chloride. Hence, the sulfate ions should not be in a high concentration, although they are harmless when present in a small amount, as herein indicated. White lead will precipitate from a hot lead chloride solution in a salt brine even if the sulfate ion is present, and lead sulfate will not be precipitated under the conditions of this process. Hence, this sulfate ion does not affect the reactions involved in making the white lead; and by leaving it in the brine to some extent, a material saving in expense is involved.

It will be appreciated that this solution of lead in a salt brine is different from a solution of lead in water, and particularly because of the fact that if cooled the complex lead-sodium chloride salt would crystallize therefrom. It will, therefore, be observed that in this process, one starts with a complex lead salt, which tends to form a complex hydroxychloride as an intermediate compound, and that the ultimate compound itself is a complex salt. One of the main purposes of this process is to so control the chemical reactions that the lead-sodium chloride is converted directly to white lead and sodium chloride by a substantially instantaneous reaction, which precludes or minimizes the formation of the intermediate lead hydroxychloride, except possibly in a rapid molecular rearrangement of elements which does not permit the formation of large aggregates of molecules as solid precipitated particles. In order to control the composition of the white lead, one has the choice of two procedures. That is, the composition of the final product may be altered by varying the ratio of the sodium carbonate to sodium hydrate employed in the precipitating solution. Likewise, the percentage of lead hydrate in the final compound may be raised by increasing by a few degrees the temperature at which the white lead is precipitated, as determined by analysis of the product. If it is desired to increase the lead carbonate portion of the final product, one may make additions of sodium carbonate to the stock of precipitating reagent. A slight excess of $Pb(OH)_2$ is desirable in some paints, as it increases not only the tinting strength of the pigment but also the content of lead soap in the paint, which gives the film of paint more resiliency and hinders cracking thereof. The permissible variations in the final product may be over only a very small range because of the requirements of the paint industry.

In accordance with the preferred procedure, the caustic alkali and the alkali metal carbonate, such as NaOH and $Na_2CO_3$, are mixed together in a carefully controlled ratio and are employed thus to carry on the entire reaction in a single stage. This ratio may be varied in accordance with the type of white lead required, but the preferred composition of white lead is made by the utilization of a ratio of 3.6 parts by weight of sodium carbonate to 1 of sodium hydroxide in a solution of the same concentration or Baumé value as that of the lead salt solution which is 90% saturated with NaCl. Typical analyses of satisfactory pigments made in accordance with this process are as follows:

| | | |
|---|---|---|
| $PbCO_3$ | 70.31 | 70.39% by weight |
| $Pb(OH)_2$ | 29.66 | 29.26% by weight |
| Ratio | 2.37 | 2.40 |

As above explained, the neutral, purified, 90% concentrated brine of NaCl has been substantially saturated with lead at 75° C. by dissolving lead sulfate and/or chloride therein, as by leaching an ore material carrying the same. The brine solution preferably contains 40 grams of lead per liter of solution. After separation from the residue by filtration or otherwise, and after such purification steps as are required, the solution is heated to a temperature in the vicinity of and preferably not higher than 84° C. so as to provide a solution which is not saturated with respect to either the lead or the sodium ions. Then the controlled ratio of sodium carbonate and sodium hydrate, preferably in solution in water of about 18 to 20° Beaumé, is added directly and rapidly to the lead solution, while stirring the latter to insure thorough mixing thereof without delay. This reagent solution is preferably of the same Baumé value as the 90% saturated salt solution, to prevent unnecessary dilution of the brine and permit its reuse economically. That is, the brine, after the precipitating step, will still be about 90% saturated with NaCl. The amount of the reagent mixture is calculated as the equivalent of the lead content of the brine as required to convert it to white lead.

The reagent solution is added rapidly to minimize the formation of the intermediate hydroxychloride; and this "rapid" rate may be defined as that which insures that all of the reagents have been added before the lead has been precipitated and the brine shows an alkaline reaction. This rate may be varied, but preferably within that limit which insures that the product has the required pigmentive properties. This rapid addition of the reagent insures that the brine does not become barren of lead in solution before the required amount of reagent can be added for producing the white lead. Consequently, the reaction is between ions in solution and does not involve a precipitated solid in suspension; nor does the simultaneous treatment with the two ions result in an intermixture of the two products, lead carbonate and lead hydroxychloride, which the two reagent ions would produce if used separately. If the reagent solution should be added too slowly, the brine would be alkaline and all of the lead precipitated by the time half of the reagent had been added; and this precipitate would not be pure white lead but a discolored basic lead compound containing the sulfate radical or chlorine and having a permanent and strong alkalinity.

The next step involves the separation of the white lead precipitate from the resultant brine. If the product is passed through an ordinary filter press and washed, it tends to form a hard cake which is difficult to treat in the subsequent stages. It is, therefore, desirable to separate the precipitate by decantation, in which the precipitate is allowed to settle and the solution is poured off or otherwise removed therefrom. This results in obtaining a strong brine solution which may be now returned to process for leaching a further quantity of ore residue. Prior to such reuse, the excess of sodium sulfate is preferably removed, as by evaporating and crystallizing it from solution. This serves as a source of sodium sulfate for the market and at the same time removes that excess amount which would tend to hinder the lead from going into solution in the brine. Also, prior to reuse of the brine, the alkalinity of the solution will be neutralized by the addition of hydrochloric or sulfuric acid, so that the brine when returned for leaching the lead ore material will be in a completely neutral condition. No sodium carbonate or sodium hydroxide should be present in the leaching brine. The brine may be further purified and its concentration adjusted as required to provide the 90% saturated neutral NaCl solution. It is to be understood that some sulfate ions may be left in the brine, depending on the sulfate content of the lead ore.

Referring now to the treatment of the white lead pulp, this material is washed with cold water of a neutral reaction after the brine has been drawn off; and this washing is preferably accomplished by settling the pulp and decanting until the weak wash water contains not over 1 gram per liter of chlorine content in the form of a chloride. It is important that the chloride content be reduced to a satisfactory minimum and that the white lead do not carry any large content thereof when used as a commercial product. The washing operation, prior to the neutralization of the alkalinity, may be aided by running the pulp through a colloid mill, which materially assists in freeing the entrained chloride by loosening up the white lead particles and in reducing the particles to a desired commercial size. This colloid mill may be of any suitable construction adapted to grind or disintegrate the pulp to a finely divided condition as is required in paints. It may comprise a grooved rotor rotated by an electric motor at high speed relative to a stator and between which the material flows and is pulverized, such as the Charlotte colloid mill. The material may be further or otherwise pulverized at any suitable stage to meet the requirements of the industry, but pulverization at this particular stage is particularly desirable because of the aid to the chloride washing operation, which provides a product substantially free from adsorbed chlorides. After passing the material through the colloid mill, it is again washed with cold water under the same alkaline conditions by settling and decantation until the white lead contains less than 0.1% of chlorine content calculated on the dry weight basis.

When the white lead is precipitated, it shows a slight permanent alkalinity. During the step of washing the pulp, this alkalinity increases and is present in the pulp at the end of the washing step. It is, therefore, desirable to neutralize this alkalinity after the washing operation, such as by the addition of a soluble lead salt or an acid of the same. Thus, one may add lead nitrate or nitric acid to the pulp until its alkalinity has been neutralized or reduced to a required amount. It will be appreciated that if the chlorine content of the pulp has not been reduced to a minimum, then the addition of the soluble lead salt would produce lead chloride as an impurity in the white lead, and this is to be avoided.

Following the neutralization of alkalinity, the pulp is again washed with cold water to remove the last traces of soluble salts or to reduce their content suitably. This final washing operation removes the lead nitrate added in the neutralization step or the resultant sodium nitrate. In order that the wash water may not contain impurities which would be precipitated by the white lead during the washing operations, the water is initially treated with thoroughly washed and undried white lead and then filtered to remove any precipitate. Such precautions as this serve to produce a product of high purity. After the final washing operation, the white lead pulp is dried and disintegrated in a suitable grinding machine and it is otherwise prepared for use as a pigment in paint and for other purposes.

By following out these various steps of the process subject to such modifications as will be readily apparent to one skilled in this art, one is enabled to produce a white lead of highly superior pigmentive properties. Moreover, the process is economical and does not require expensive apparatus or reagents. Various solutions may be used repeatedly in the precipitation and solution steps, and the concentrations of the solutions may be easily maintained as required to render the process efficient. Various other advantages will be apparent to one who is skilled in this art.

Having thus described the invention, what is claimed as new and desired to obtain by Letters Patent is:

1. The method of making white lead pigment comprising the steps of providing a hot, neutral, alkali metal chloride brine containing a solution of one of the group consisting of lead sulfate, lead chloride and a mixture thereof, maintaining the temperature thereof between 75° C. and 84° C. and adding simultaneously thereto alkali metal carbonate and alkali metal hydroxide in aqueous solution which are in such predetermined amounts and in approximately that ratio as are required to form from the lead salt in solution a white lead pigment having a composition conforming substantially to the molecular formula $2PbCO_3 \cdot Pb(OH)_2$, while maintaining a rate of addition of the reagents which prevents the solution from becoming alkaline before the entire amounts thereof have been added, and thereafter separating the precipitate from the solution and recovering the same.

2. The method of making white lead pigment according to claim 1 wherein sodium carbonate and sodium hydroxide are employed as the precipitating reagents in approximately the ratio of 3.6 to 1 by weight.

3. The method according to claim 1 in which the lead salt is dissolved in a strong but unsaturated sodium chloride brine at a temperature of about 75° C. after which the temperature of the solution is raised to a point not higher than 84° C. and the precipitation of the white lead is carried on at that temperature at which the lead sodium chloride solution is unsaturated.

4. The method of making white lead pigment comprising the steps of providing a hot, unsaturated sodium chloride brine containing a solution of one of the group consisting of lead sulfate, lead chloride and a mixture thereof, treating the solution simultaneously with sodium carbonate and sodium hydroxide in aqueous solution which are in approximately the ratio of 3.6 to 1 by weight, while maintaining the temperature between 75° C. and 84° C. and adding the reagents at a rate sufficient to prevent the solution from becoming alkaline before substantially the entire amounts have been added, and thereafter separating the white lead precipitate from the solution and recovering the same.

5. The method of making white lead comprising the steps of dissolving one of the group consisting of lead sulfate, lead chloride and a mixture thereof in a neutral, but unsaturated solution of sodium chloride at a temperature of about 75° C. but materially below 84° C., raising the temperature to not over 84° C. and thereby providing an unsaturated solution, treating the hot solution simultaneously with a solution of definite amounts of sodium carbonate and sodium hydroxide intermixed in a ratio of approximately 3.6 to 1 parts by weight to form white lead from all of the lead salt in solution, while adding the reagents at a rate which prevents the resultant solution from becoming alkaline before substantially all of the reagents have been added, and thereafter separating the brine from the precipitate and recovering the latter for use as a pigment.

6. The method of making white lead pigment comprising the steps of providing a hot, neutral, alkali metal chloride brine containing a solution of one of the group consisting of lead sulfate, lead chloride and mixtures thereof, adding simultaneously thereto alkali metal carbonate and alkali metal hydroxide in aqueous solution in approximately that ratio required to form white lead, carrying on the precipitation at such a temperature in the vicinity of 84° C. as to provide a pigment which has a ratio by weight of $PbCO_3$ to $Pb(OH)_2$ between 2.37 and 2.40, and adding the reagents at that rate which prevents the solution from becoming alkaline before the entire amounts thereof have been added, and thereafter recovering the precipitate.

7. The method according to claim 1 in which such a ratio of the precipitating reagents is used as to give a final pigment having a ratio of $PbCO_3$ to $Pb(OH)_2$ which lies between 2.37 and 2.40.

8. The method of making white lead according to claim 1 in which sodium carbonate and sodium hydrate are used in such a ratio and the precipitation is carried on at such a temperature that the ratio of $PbCO_3$ to $Pb(OH)_2$ lies between 2.37 and 2.40 in the final pigment.

9. The method of claim 1 in which the concentrations of the reagents in the precipitating solution are such that the final brine has substantially the same concentration of alkali metal chloride as that of the original lead bearing salt solution so as to prevent dilution of the salt brine and permit its reuse in the process.

10. The method of claim 1 in which the lead salt solution is derived by leaching a raw material containing the lead salt with a sodium chloride brine which is neutral and free from elements capable of precipitating during the subsequent pigment making process and which is about 90% saturated at room temperature, while maintaining a temperature of about 75° C., after which the solution temperature is raised to a point not higher than 84° C. for the precipitation stage.

11. The method of making white lead in accordance with claim 1 in which a raw material containing lead sulfate is leached with a hot sodium chloride brine, and the white lead is precipitated by means of sodium carbonate and sodium hydroxide in about the ratio of 3.6 to 1 by weight while in the presence of the sulfate ions.

12. The method of making white lead according to claim 4 in which the final precipitate, after removal from the brine, is washed with water to reduce its chlorine content to less than 0.1%, after which it is dried.

13. The method of making white lead according to claim 4 in which the final precipitate, after removal from the brine, is washed with water which has been purified by treatment with lead carbonate and filtration to remove such impurities as have been precipitated.

14. The method of making white lead according to claim 4 in which the precipitate, after removal from the brine, is washed with water to remove soluble chlorides and then treated with a sufficient amount of a reagent of the group consisting of nitric acid and lead nitrate for neutralizing the alkalinity thereof and again washed with water and dried.

15. As a new composition of matter, a white lead pigment of high resistance to weather, covering power and tinting strength and having an analysis of approximately 2.37 to 2.40 parts by weight of $PbCO_3$ to one part of $Pb(OH)_2$ which has been produced by the direct and rapid precipitation thereof at a temperature between 75° and 84° C. from a sodium chloride solution containing one of the group consisting of lead sulfate, lead chloride and a mixture thereof by a reagent having approximately 3.6 parts by weight of a sodium carbonate to one part of sodium hydrate and added at a rate which prevents the solution from becoming alkaline before all of the reagent has been introduced.

ROYAL L. SESSIONS.

CERTIFICATE OF CORRECTION.

Patent No. 2,082,032.

June 1, 1937.

ROYAL L. SESSIONS.

It is hereby certified that error appears in the printed specification of the above numbered patent requiring correction as follows: Page 5, second column, line 2, claim 8, for the claim reference numeral "1" read 4; and that the said Letters Patent should be read with this correction therein that the same may conform to the record of the case in the Patent Office.

Signed and sealed this 20th day of July, A. D. 1937.

Henry Van Arsdale

Acting Commissioner of Patents.

(Seal)